United States Patent [19]
Clark

[11] Patent Number: 6,044,965
[45] Date of Patent: Apr. 4, 2000

[54] TROUGHING IDLERS FOR BELT CONVEYORS

[76] Inventor: Philip G. Clark, 46256 266th St., Hartford, S. Dak. 57033

[21] Appl. No.: 09/025,563

[22] Filed: Feb. 18, 1998

[51] Int. Cl.[7] .................................................. B65G 15/08
[52] U.S. Cl. .......................... 198/829; 198/824; 198/826; 198/830; 198/493
[58] Field of Search .................................. 198/824, 825, 198/826, 829, 830

[56] References Cited

U.S. PATENT DOCUMENTS

| | | |
|---|---|---|
| 756,519 | 4/1904 | Olson . |
| 809,227 | 1/1906 | Steckel . |
| 2,031,618 | 2/1936 | Robins . |
| 2,249,588 | 7/1941 | Waddle . |
| 2,358,609 | 9/1944 | Uhlig ...................................... 198/824 |
| 2,927,681 | 3/1960 | Moon . |
| 3,294,218 | 12/1966 | Chantland . |
| 3,338,381 | 8/1967 | Imse ...................................... 198/825 |
| 3,809,211 | 5/1974 | Padilla . |
| 3,878,936 | 4/1975 | Niggemyer . |
| 4,844,241 | 7/1989 | Woodward . |
| 4,919,253 | 4/1990 | Morrison ................................. 198/830 |

FOREIGN PATENT DOCUMENTS

| | | |
|---|---|---|
| 5221508 | 8/1993 | Japan . |
| 268065 | 8/1950 | Switzerland ........................... 198/829 |
| 2234482 | 6/1991 | United Kingdom . |

Primary Examiner—Christopher P. Ellis
Assistant Examiner—Joe Dillon, Jr.
Attorney, Agent, or Firm—Baker Botts L.L.P.

[57] ABSTRACT

A troughing idler of an enclosed belt conveyor has a horizontal shaft that is supported by antifriction bearings mounted outside of the side walls of the trunking and carries a medial roller. Each of the side walls of the trunking supports a downwardly and inwardly sloping side roller in cantilevered relation by means of a side roller carrier that is mounted on the side wall and includes a spindle, a hub, and inboard and outboard antifriction bearings interposed between the spindle and the hub. The medial roller and the side rollers are arranged relative to each other so as to support the belt with side portions sloping upwardly and outwardly with respect to a medial portion.

18 Claims, 4 Drawing Sheets

TROUGHING IDLERS FOR BELT CONVEYORS

TECHNICAL FIELD OF THE INVENTION

The present invention relates generally to belt conveyors and, more particularly, to troughing idlers that are particularly well-suited for use in enclosed belt conveyors.

BACKGROUND OF THE INVENTION

Hansen Manufacturing Corp. Of Sioux Falls, S.Dak., makes and sells enclosed belt conveyors under the trademark HI ROLLER™, in which the belt and the elements that support it are completely enclosed in a housing, which is usually called the "trunking." The trunking provides a structural support for troughing idlers, the belt and the material being conveyed, protects the material being conveyed by keeping out foreign substances and, in an outside installation, rain and snow, and keeps dust and any fugitive material that falls from the belt from entering the environment. The previously known HI ROLLER™ conveyors, which are in widespread use for conveying various materials, especially grains, have troughing idlers that resemble spools in that they have a body having a circular cylindrical medial surface and frusto-conical side surfaces that diverge outwardly from the medial surface. The belt nests in the body, which shapes the belt (in cross section) into a trough. The body is affixed to a shaft, the ends of which pass through holes in the side walls of the conveyor trunking and are supported in bearings located outside of the trunking. An important advantage of the spool-like troughing idlers is that the bearings are located outside of the enclosure and are, therefore, not exposed to any dust produced by the materials being conveyed and are accessible for greasing from time to time. Also, the likelihood of any grease that might leak from a bearing entering the trunking and contaminating the material being conveyed is very small. Inasmuch as the body and shaft rotate, dust cannot build up on them, and there are no internal fixed frames or supporting elements for the spool-like idlers within the troughing where dust can accumulate. Should a bearing fail and overheat, it is not likely to be a source of ignition for a fire or detonation of the dusty atmosphere within the troughing by virtue of its isolation outside of the troughing.

Spool-like troughing idlers have the disadvantage of inherently producing slippage between the belt and the frusto-conical side surfaces of the body, which run at a surface speed that progressively increases as a function of the distance radially from the circular cylindrical medial portion. The slippage causes wear of the belt and the side surfaces of the idler, especially if the material being conveyed includes hard, abrasive particles that can stick to the belt.

There are many specific forms of troughing idlers in which both a medial horizontal roller and separate sloping side rollers run at the same surface speeds, the rollers being of the same diameters and being mounted for rotation on separate shafts. In most designs, the rollers are tubular and supported by bearings within them that are carried by stationary shafts that are attached at opposite ends of the rollers to framing or stands. The shafts and frames are prone to buildups of dust. The bearings are close to the dusty environment of the belt, and if they fail and become highly heated, can ignite a fire. The foregoing shortcomings of previously known designs of three-roller type troughing idlers make them only marginally useful, at best, in enclosed belt conveyors, particularly for conveyors used for conveying grain where the environment is very dusty, the dust is highly flammable, and contamination is unacceptable.

SUMMARY OF THE INVENTION

Throughout this document, the terms "inboard" and "outboard" are used for convenience to locate the positions of various components relative to other components with respect to the longitudinal center of the path of a conveyor belt supported by the troughing idlers.

One object of the present invention is to provide troughing idlers in which all running surfaces travel at equal surface velocities, thus avoiding slippage anywhere between the belt and the idlers. Another object is to avoid having exposed portions of shafts and fixed frame members supporting the shafts where dust can collect. It also an object to make the bearings that support the rollers of troughing idlers accessible for lubrication from outside trunking that fully encloses the belt and the idler rollers. Yet another object is to isolate the bearings that support troughing idler rollers as much as possible from the interior of enclosed trunking so as to make contamination of the interior of the trunking by leaking lubricant and exposure of the enclosed interior to heat from failed bearings very unlikely.

The foregoing objects are attained, in accordance with the present invention, by a troughing idler installation that includes side supports located opposite each other with respect to a space along which a conveyor belt moves along a belt path, a horizontal shaft extending across the space between the support members transversely to the belt path and having a medial roller affixed thereon, and antifriction bearings mounted on the side supports and supporting the horizontal shaft for rotation about a shaft axis. A side roller unit is supported exclusively by each side support member. Each side roller unit has a side roller carrier that includes a spindle, a hub, and inboard and outboard antifriction bearings interposed between the spindle and the hub, and a side roller supported in cantilevered relation with respect to the side support member by the side roller carrier for rotation about the spindle axis. The medial roller and the side rollers are arranged relative to each other so as to support the belt with side portions of the belt sloping upwardly and outwardly with respect to a horizontal medial portion of the belt.

The mounting of each side roller on the side support in cantilevered relation—each side roller is supported exclusively by a carrier unit mounted on the side support—eliminates any exposed shaft portion and a supporting frame for the side roller shaft located between the side supports in the space along which the belt runs on which dust and material that falls from the belt can collect. The elimination of any stationary parts in the space between the side supports is especially important in enclosed belt conveyors, such as the HI ROLLER™ conveyors. In enclosed conveyors, virtually all dust and fugitive material falls to the floor of the trunking and is swept by the belt on its return run, in which it slides along the liner on the trunking floor, back to the tail end for return to the upper, delivery run of the belt by a reloader.

The specific design of the side roller carriers can vary considerably. In some designs of the side roller carriers, the spindle is affixed to the side support and the side roller is affixed to the hub. The spindle has an inner threaded end that is received within the hub and receives a retainer nut for the inner race of the inboard antifriction bearing. The inboard end of the hub is located inboard of the retainer nut and receives a hub cap for retaining a lubricant within the hub.

The outboard end of the hub is located outboard of the outboard bearing, and a grease seal is interposed between the outboard end of the hub and the spindle to retain a lubricant within the hub. With the configuration described above, the hub cap at the inboard end of the hub prevents lubricant from leaking into the space inboard of the side support and prevents dust and fugitive material from entering the hub. If a bearing should fail, the hub cap will retain any fragments of the bearing that might break loose and keep them from entering the belt space. Retention of fragments of failed bearings, which may be extremely hot, is of considerable importance in minimizing the chance of a failed bearing starting a fire or triggering a dust explosion in the conveyor.

Another advantage of a configuration in which the spindle is affixed to the support member and the hub is on the roller is the ability to locate the grease seal at the outboard end of the side roller carrier, which is at the highest point of the unit and will usually be outside of the space between the side supports. The high position minimizes the possibility of grease leaking from a worn or failed grease seal. The outboard location of the grease seal minimizes the possibility of leaking grease getting into the space and contaminating the material being conveyed.

The inboard and outboard antifriction bearings may be closely spaced apart and proximate to the side support member, in which case the spindle is relatively short, or they may be widely spaced apart on a spindle that extends along a major part of the length of the side roller shell. In the former case, the antifriction bearings are located as remotely as possible from the belt. A consideration here again is with a bearing failure and the resulting heat. Having the bearings remote from the belt and the dusty environment of the belt reduces the chance of a fire in enclosed belt conveyors used to convey grain, for example. A trade-off for a short spindle and closely spaced bearings is a greater overhung moment and higher bearing loads. A relatively longer spindle/hub results in lower bearing loads. The isolation of the bearings in the hub and a hub cap for containment of bearing fragments and exclusion of dust from the hub offers a high degree of assurance that a failed bearing will not cause a fire.

In a configuration in which a long spindle/hub and widely spaced bearings are provided, it is advantageous, for further isolation of the bearings, to provide a roller shell that is spaced apart radially from the hub and supported concentrically with the hub by annular rings. The dead air space between the hub and the roller shell is a thermal barrier to heat transfer from a failed bearing to the shell.

For economy of manufacture and minimizing bearing loads, it is advantageous to make the side roller as a tubular shell. For further thermal isolation of the bearings from a dusty environment, a dust cap should be affixed in the inboard end of the shell. When the troughing idlers of the present invention are used in an enclosed belt conveyor, a dust seal should be incorporated between the side roll shell or the hub and an element, such as the side support or a bracket by which the side roll carrier is mounted on the side support, to keep dust from leaking from the trunking.

Another configuration for the side roll carrier is to affix the hub to the side support member, preferably to the outboard side, and the spindle to the side roller. The spindle may have a threaded outboard end, onto which a retainer nut is threaded to retain the outboard antifriction bearing on the spindle. The hub has an outboard end located outwardly of the outboard bearing and the side roller unit further includes a hub cap on the outboard end of the hub to retain a lubricant within the hub. A grease seal is installed between the hub and the spindle inboard of the inboard antifriction bearing. The side roller has a tubular shell and a dust cap is affixed in the inboard end of the shell.

A design of the configuration just described has the advantages of simplicity and economy. Also, the roller carrier is outboard of the support and away form the dusty environment. Those advantages may not, however, outweigh an inherent large overhung moment—high bearing loads— and the location of the grease seal at the inboard side of the bearing where a failure can allow grease to leak into the inboard side of the side support and into the material being conveyed.

BRIEF DESCRIPTION OF THE DRAWINGS

For a more complete understanding of the present invention and additional preferred features, and the advantages thereof, reference may be made to the following written description of exemplary embodiments, taken in conjunction with the accompanying drawings, in which.

DESCRIPTION OF THE EMBODIMENTS

An exemplary embodiment of the present invention and its advantages are best understood by referring to FIGS. 1 to 7 of the drawings, like numerals being used for like and corresponding parts of the various FIGURES. The teachings of the present specification may be used to advantage in troughing idlers of various configurations.

A belt conveyor in which the present invention is useful to considerable advantage and which is well-known, per se, has an elongated trunking 10 that extends the entire length of the conveyor from a tail end 12 to a head end 14. The trunking 10 is essentially a hollow duct-like enclosure fabricated of steel sheet or plate stock in which all components of the conveyor other than bearings (see below), a drive motor 16, and a power transmission 18 driven by the motor are located. The trunking protects the material being conveyed from the environment and the environment from the material. Ordinarily, the trunking of enclosed belt conveyors is of modular construction, consisting of identical rectangular sections 10S that are bolted together end to end along end flanges 10f (see FIGS. 3 and 4). The covers 19 of each section 10S of the trunking are fastened to the upper edges of the side walls by clips 19c.

An endless belt 20 is trained at the tail end 12 around a tail pulley (not shown), which is supported by bearings 22, and at the head end by a driven head pulley 24 (not shown), which is supported by bearings 26 and is driven by the motor and drive 16 and 18. The belt 20 carries material M (see FIG. 2) supplied at the tail end in a suitable manner along an upper run, along which the belt is supported by spool-like troughing idlers 28 that are journaled in bearings 30 installed outside the side walls 32 of the trunking 10. The tension in the belt is adjusted by an adjuster section 34. The belt 20 returns to the tail end 12 by sliding along the floor 36 of the trunking, which is lined with liner sheets 38 of a rigid low friction polymeric material, such as ultra high molecular weight polyethylene. The liner sheets 38 are substantially coextensive with the trunking floor, except for small gaps where the sheets meet end to end. One or two liner sheets are provided in each section of modular trunking. The sliding of the belt along the trunking floor continuously sweeps dust and material that falls from the upper run of the belt 20 back to the tail end 12, where known devices return it to the upper run for conveyance to the discharge location of the conveyor. Various discharge devices are used with enclosed belt conveyors, some of which include stationary tripper valves for diverting the flow.

Figures 1, 2:
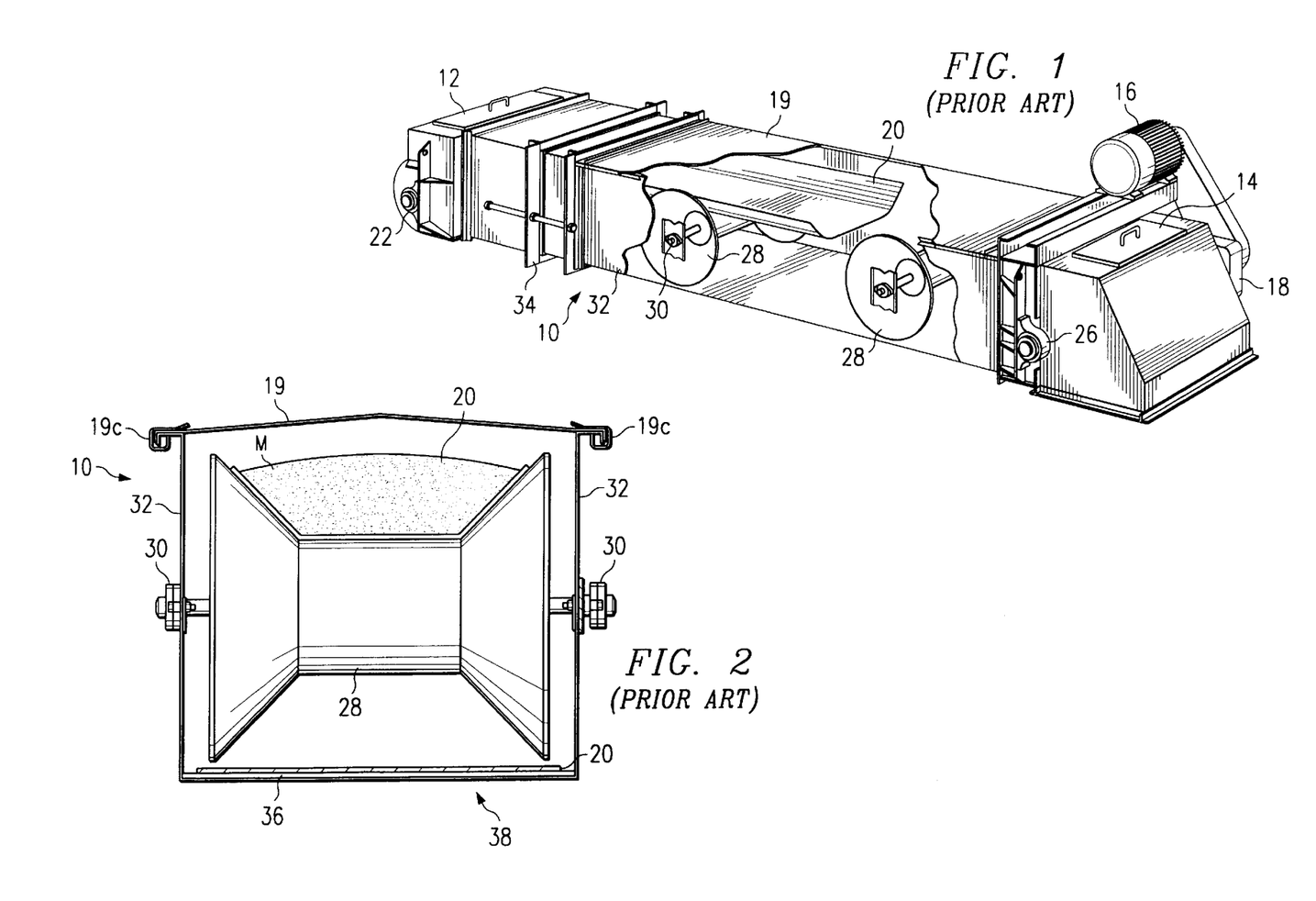
FIG. 1 is a pictorial schematic view of a prior art enclosed belt conveyor, a portion of the trunking being broken away.
FIG. 2 is a schematic end cross-sectional view of the enclosed belt conveyor shown in FIG. 1.

As discussed above, troughing idlers according to the present invention may be used to particular advantage in enclosed belt conveyors, such as the one shown in FIGS. 1 and 2. The troughing idlers of the present invention are supported solely from the side wall 32 of the trunking.

Figure 3:
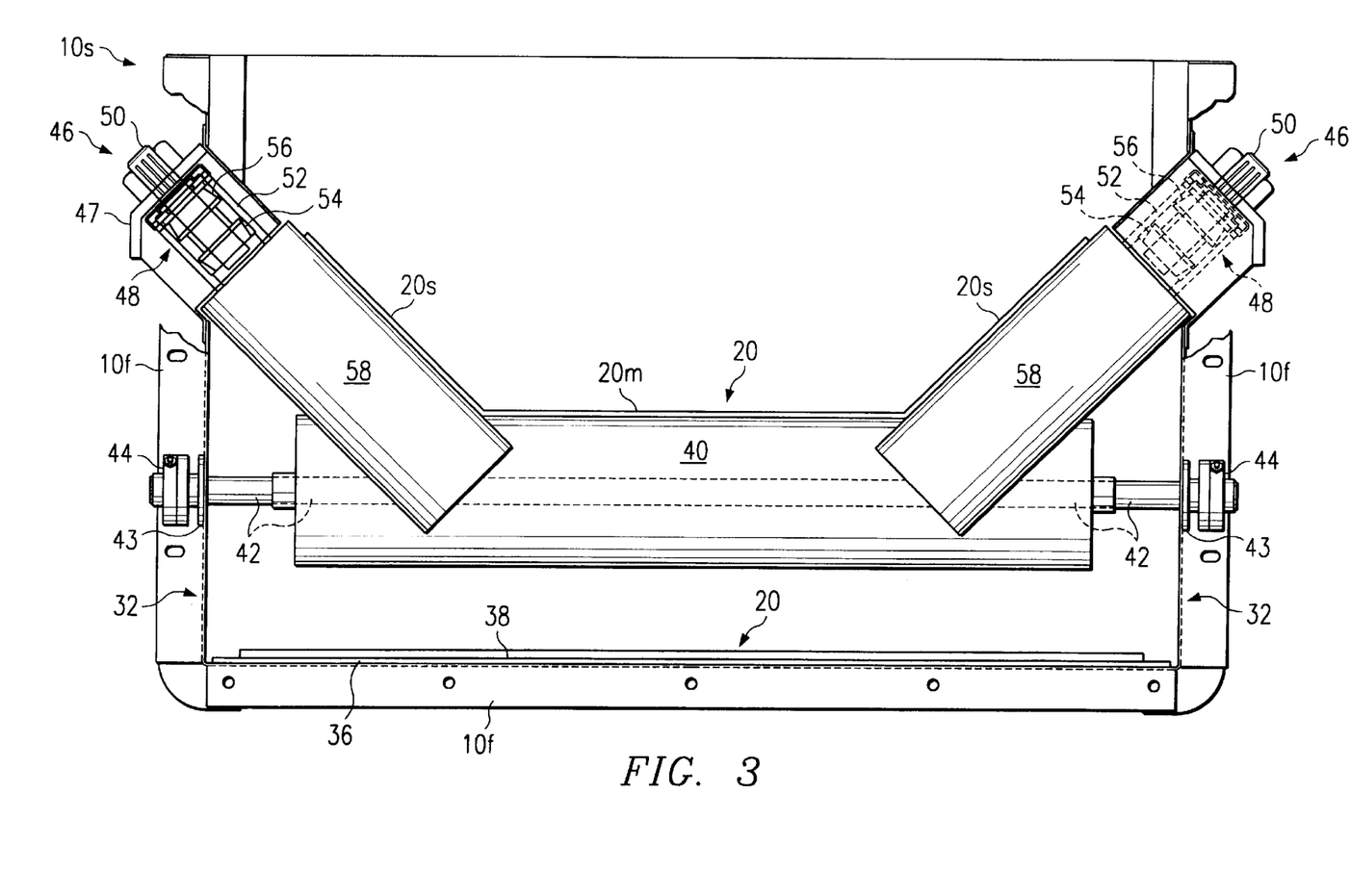
FIG. 3 is an end elevational view of a trunking section of an enclosed belt conveyor that is equipped with troughing idlers according to the present invention.
Figures 4, 5:
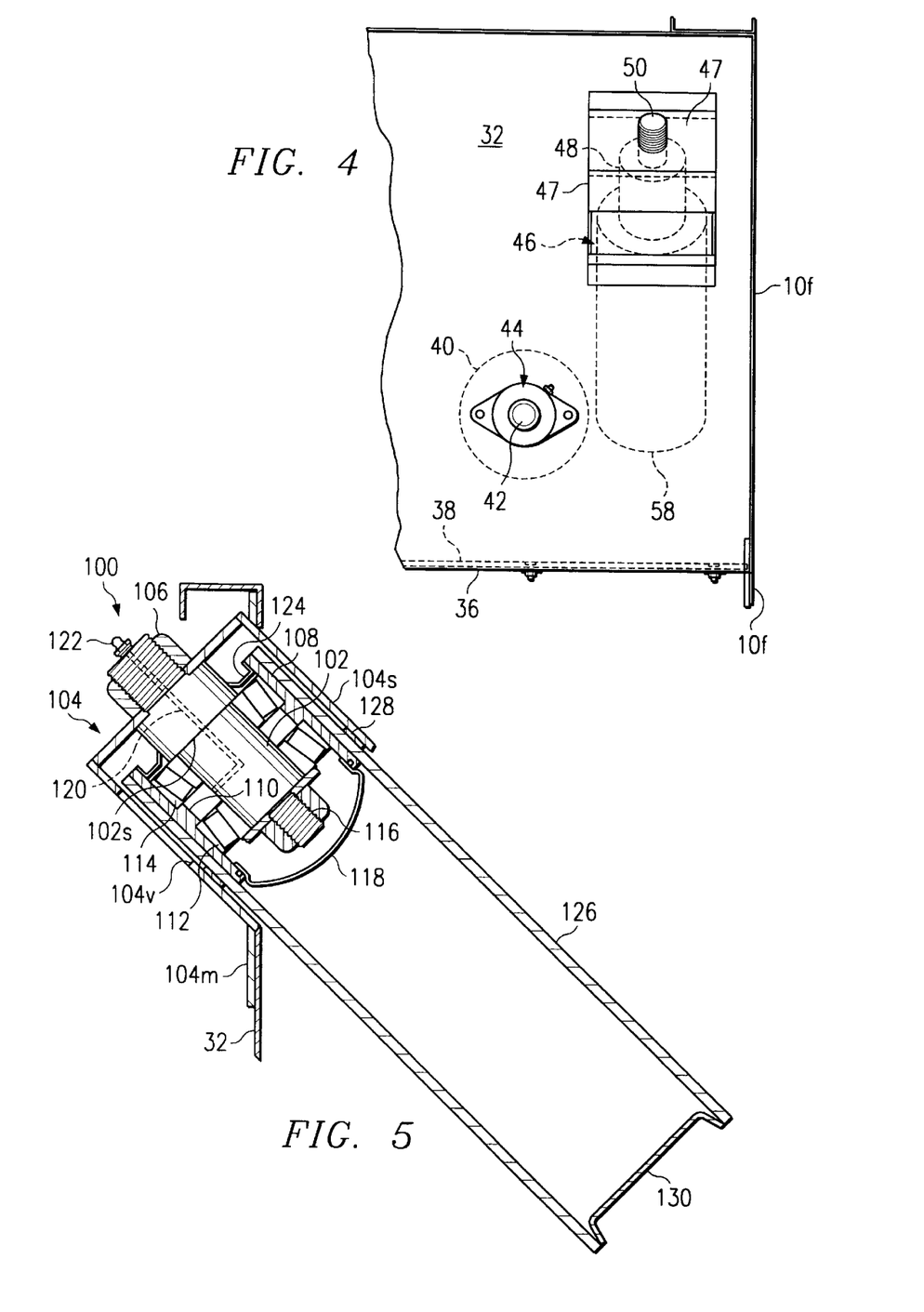
FIG. 4 is a partial side elevational view of the trunking section of FIG. 3.
FIG. 5 is a side cross-sectional view, in generally schematic form, of a first embodiment of a side roller unit of a troughing idler embodying the present invention.

In the embodiment shown in FIGS. 3 and 4, a medial roller 40 in the form of a tubular shell is affixed to a horizontal shaft 42, the end portions of which pass through the side walls 32 of the toughing section and seals 43 and are supported by antifriction bearings 44 that are fastened to the side walls. A side roller unit 46 is mounted in each side wall 32. Each unit 46 includes a side roller carrier 48 that has a spindle 50, a hub 52, and inboard and outboard antifriction bearings 54 and 56 interposed between the spindle and the hub. The side roll carrier is attached to the trunking wall 32 by a bracket 57 and supports a side roller 58 in cantilevered relation with respect to the trunking side wall 32 for rotation about the axis of the spindle 50. The medial roller 40 and the side rollers 58 are arranged relative to each other so as to support the belt 20 with side portions 20s sloping upwardly and outwardly with respect to a medial portion 20m. The axes of rotation of the side rollers 58 lie in a vertical plane perpendicular to the longitudinal axis of the trunking section 10S and slope downwardly and inwardly from the side walls 32 at an angle that may vary within a wide range, a range of from 20° to 45° being common. The side rollers 58 are spaced apart a small distance longitudinally from the medial roller 40 (see FIG. 4), which allows the lower ends of the side rollers 58 to overlap the end portions of the medial roller 40 in end elevation, thus enabling the belt to be fully supported across its lateral extent.

The side roller unit 100 shown in FIG. 5 has a very short spindle 102 that is attached to a bracket 104 by a nut 106 that is threaded onto the threaded outboard end of the spindle. The bracket 104 has a circular cylindrical tubular side wall 104s, which is vented through a vent slot 104v so that clean air surrounds the hub and bearings for a safe environment. A mounting plate 104m with an elliptical hole receives and is affixed to the side wall 104s of the bracket and is bolted (bolts not shown) to the trunking side wall 32.

The spindle 102 carries a hub 108, which has an internal rib 110 to form shoulders for the outer races of an inboard antifriction bearing 112 and an outboard antifriction bearing 114. The inner races are received on the spindle 102 and held in place between a shoulder 102s on the spindle and a retainer nut/washer 116 threaded onto the threaded inboard end of the spindle. The inboard end of the hub 108 lies inboard of the inboard bearing 112 and receives a hub cap 118, which captures a lubricant supplied through a lubricant passage 120 and grease fitting 122 within the hub, prevents particles from escaping from within the hub (e.g., hot pieces of a failed bearing), and keeps dust out of the hub. A grease seal 124 is received between the outboard end of the hub 108 and the spindle 102.

The hub 108 is press-fit (or otherwise suitably connected) to a side roller shell 126. A dust seal 128 keeps dust from within the trunking 10 from escaping from the trunking into the annular space between the shell 126 and the side wall 104s of the bracket. A dust cap 130 keeps dust from entering and collecting inside the shell.

Figures 6, 7:
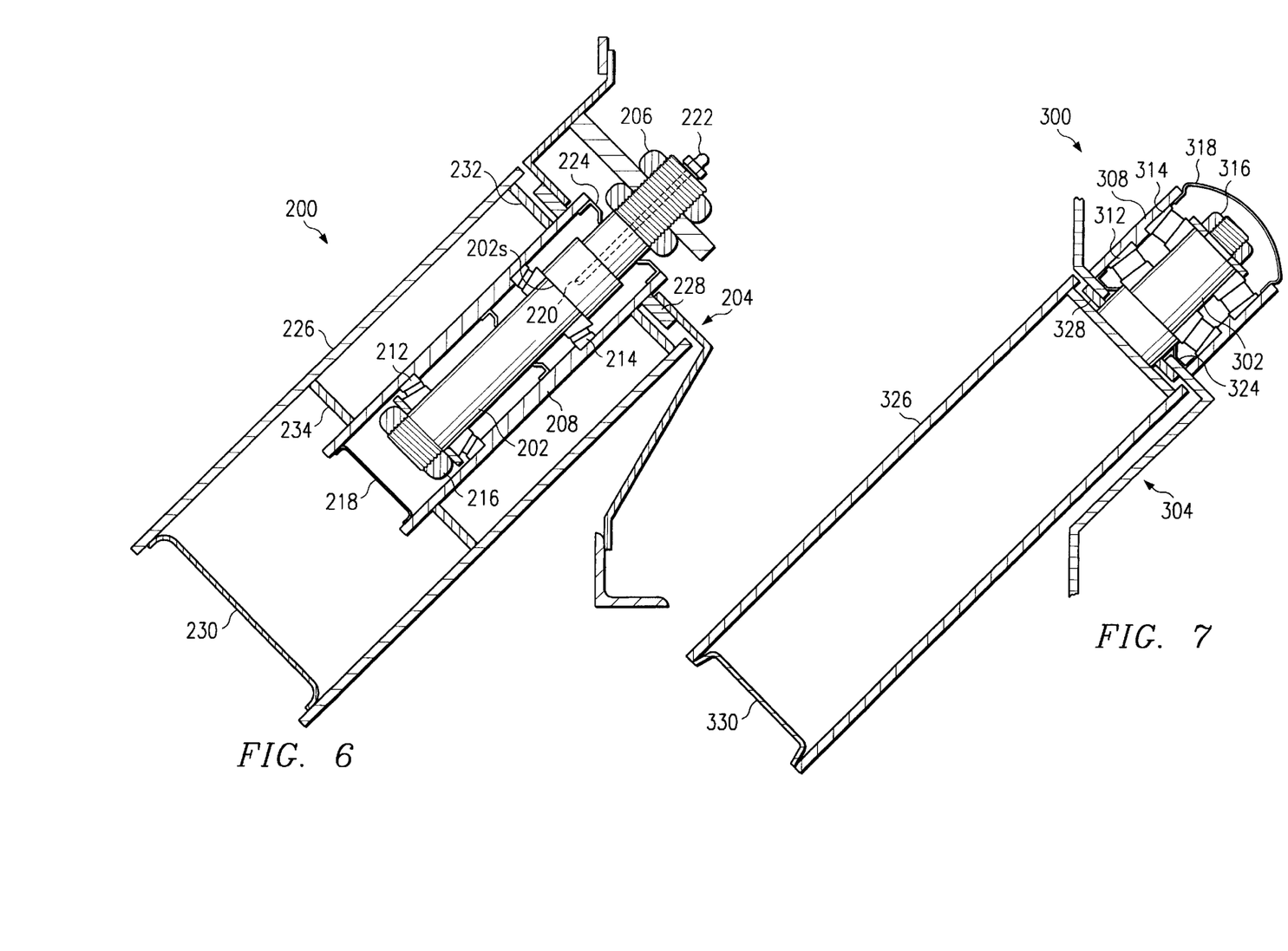
FIG. 6 is a side cross-sectional view, in generally schematic form, of a second embodiment of a side roller unit of a troughing idler embodying the present invention.
FIG. 7 is a a side cross-sectional view, in generally schematic form, of a third embodiment of a side roller unit of a troughing idler embodying the present invention.

A stationary spindle may be of any desired length, as the side roller unit 200 of FIG. 6 shows. The unit 200 is similar to the unit 100 of FIG. 5. Hence, the same reference numerals as used in FIG. 5, but increased by 100, are applied to FIG. 6, and the description of the unit 100 of FIG. 5 applies in most respects to the unit 600 of FIG. 6. One will observe a different form of mounting bracket 204, the more widely spaced antifriction bearings 212 and 214, a dust seal 228 secured to the bracket, and the connection of the hub 208 to the roller shell 226 by annular rings 232 and 234.

FIG. 7 shows a side roll unit 300 (the same reference numerals are used in FIG. 7 as in FIG. 5, but increased by 200) in which the hub 308 is affixed to the outboard side of the bracket 304, such as by bolting side flanges (not shown) on the hub to the bracket, and is thus stationary, and the spindle 302 is affixed to the roller shell 336. The structure and function of the unit 300 can be fully understood from the foregoing description of the unit 100 of FIG. 5 and the drawing figure.

What is claimed is:

1. A troughing idler installation comprising
   side supports located opposite each other with respect to a space along which a conveyor belt moves along a belt path;
   a horizontal shaft extending across the space between the side supports transversely to the belt path and having a medial roller affixed thereon;
   antifriction bearings mounted on the side supports and supporting the horizontal shaft for rotation about a shaft axis; and
   a side roller unit supported exclusively by a side support member, each side roller unit having
      a side roller carrier that includes a spindle, a hub, and inboard and outboard antifriction bearings interposed between the spindle and the hub, and
      a side roller supported in cantilevered relation with respect to the side support member by the side roller carrier about a spindle axis;
   the medial roller and the side rollers being arranged relative to each other so as to support the belt with side portions of the belt sloping upwardly and outwardly with respect to a medial portion of the belt.

2. A troughing idler installation according to claim 1 wherein the hub is affixed to the side support member and the spindle is affixed to the side roller.

3. A troughing idler installation according to claim 2 wherein the hub is affixed to the outboard side of the the support member.

4. A troughing idler installation according to claim 3 wherein the spindle has a threaded outboard end and a retainer nut is threaded onto the outboard end and retains the outboard antifriction bearing on the spindle and prevents the spindle from sliding axially downwardly through the bearings.

5. A troughing idler installation according to claim 4 wherein the outboard end of the hub is located outwardly of the outboard bearing and the side roller unit further includes a hub cap on the outboard end of the hub to retain a lubricant within the hub.

6. A troughing idler installation according to claim 5 wherein the side roller unit includes a grease seal between the hub and the spindle inboard of the inboard antifriction bearing.

7. A troughing idler installation according to claim 6 the side roller has a tubular shell and a dust cap is affixed in the inboard end of the shell.

8. A troughing idler installation according to claim 6 wherein the support member is a side wall of a trunking and said belt conveyor is enclosed in said trunking.

9. A troughing idler installation according to claim 1 wherein the spindle is affixed to the side support and the side roller is affixed to the hub.

10. A troughing idler installation according to claim 9 wherein the spindle has an inner threaded end that is received within the hub and receives a retainer nut for the inboard antifriction bearing.

11. A troughing idler installation according to claim 10 wherein the hub has an inboard end located inboard of the retainer nut with respect to the inboard antifriction bearing and receiving a hub cap for retaining a lubricant within the hub.

12. A troughing idler installation according to claim 10 wherein the hub has an outboard end located outwardly of the outboard bearing, and the side roller unit further includes a grease seal between the outboard end of the hub and the spindle to retain a lubricant within the hub.

13. A troughing idler installation according to claim 12 wherein the spindle and the hub are elongated and are coextensive with a major portion of the side roller, and the inboard and outboard antifriction bearings are widely spaced apart on the spindle.

14. A troughing idler installation according to claim 13 wherein the side roller has a tubular shell, the shell is spaced apart radially from the hub, and spaced apart annular discs join the shell to the hub.

15. A troughing idler installation according to claim 10 wherein the inboard and outboard antifriction bearings are closely spaced apart and proximate to the side support member.

16. A troughing idler installation according to claim 15 wherein the side roller has a circular cylindrical shell and a dust cap is affixed in the inboard end of the shell.

17. A troughing idler installation according to claim 16 wherein the support member is a side wall of a trunking of an enclosed belt conveyor, and the spindle is affixed to a mounting bracket received in an opening in the trunking side wall.

18. A troughing idler installation according to claim 17 wherein the mounting bracket includes a sleeve surrounding an outboard end portion of the shell and the side roller unit includes a dust seal interposed between the sleeve and the shell.

* * * * *

(12) EX PARTE REEXAMINATION CERTIFICATE (9541st)
United States Patent
Clark (10) Number: US 6,044,965 C1
(45) Certificate Issued: Mar. 5, 2013

(54) TROUGHING IDLERS FOR BELT CONVEYORS

(75) Inventor: Philip G. Clark, Hartford, SD (US)

(73) Assignee: The Toronto-Dominion Bank, Toronto (CA)

Reexamination Request:
No. 90/011,874, Sep. 28, 2011

Reexamination Certificate for:
Patent No.: 6,044,965
Issued: Apr. 4, 2000
Appl. No.: 09/025,563
Filed: Feb. 18, 1998

(51) Int. Cl.
*B65G 15/08* (2006.01)

(52) U.S. Cl. ........ 198/829; 198/824; 198/826; 198/830; 198/493

(58) Field of Classification Search .................. None
See application file for complete search history.

(56) References Cited

To view the complete listing of prior art documents cited during the proceeding for Reexamination Control Number 90/011,874, please refer to the USPTO's public Patent Application Information Retrieval (PAIR) system under the Display References tab.

*Primary Examiner* — Glenn K. Dawson (57) ABSTRACT

A troughing idler of an enclosed belt conveyor has a horizontal shaft that is supported by antifriction bearings mounted outside of the side walls of the trunking and carries a medial roller. Each of the side walls of the trunking supports a downwardly and inwardly sloping side roller in cantilevered relation by means of a side roller carrier that is mounted on the side wall and includes a spindle, a hub, and inboard and outboard antifriction bearings interposed between the spindle and the hub. The medial roller and the side rollers are arranged relative to each other so as to support the belt with side portions sloping upwardly and outwardly with respect to a medial portion.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3-8, 10 and 12-17 are cancelled.

Claims 2, 9, 11 and 18 are determined to be patentable as amended.

New claims 19-40 are added and determined to be patentable.

2. A troughing idler installation according to claim [1] *37* wherein the hub is affixed to the side support member and the spindle is affixed to the side roller.

9. A troughing idler installation according to claim [1] *20* wherein the spindle is affixed to the side support and the side roller is affixed to the hub.

11. A troughing idler installation [according to claim 10] *comprising:*

*side supports located opposite each other with respect to a space along which a conveyor belt moves along a belt path;*

*a horizontal shaft extending across the space between the side supports transversely to the belt path and having a medial roller affixed thereon;*

*antifriction bearings mounted on the side supports and supporting the horizontal shaft for rotation about a shaft axis; and*

*a side roller unit supported exclusively by a side support member, each side roller unit having*

*a side roller carrier that includes a spindle, a hub, and inboard and outboard antifriction bearings interposed between the spindle and the hub, and*

*a side roller supported in cantilevered relation with respect to the side support member by the side roller carrier about a spindle axis;*

*the medial roller and the side rollers being arranged relative to each other so as to support the belt with side portions of the belt sloping upwardly and outwardly with respect to a medial portion of the belt;*

*wherein the spindle is affixed to the side support and the side roller is affixed to the hub;*

*wherein the spindle has an inner threaded end that is received within the hub and receives a retainer nut for the inboard antifriction bearing; and* wherein the hub has an inboard end located inboard of the retainer nut with respect to the inboard antifriction bearing and receiving a hub cap for retaining a lubricant within the hub.

18. A troughing idler installation [according to claim 17] *comprising:*

*side supports located opposite each other with respect to a space along which a conveyor belt moves along a belt path;*

*a horizontal shaft extending across the space between the side supports transversely to the belt path and having a medial roller affixed thereon;*

*antifriction bearings mounted on the side supports and supporting the horizontal shaft for rotation about a shaft axis; and*

*a side roller unit supported exclusively by a side support member, each side roller unit having*

*a side roller carrier that includes a spindle, a hub, and inboard and outboard antifriction bearings interposed between the spindle and the hub, and*

*a side roller supported in cantilevered relation with respect to the side support member by the side roller carrier about a spindle axis;*

*the medial roller and the side rollers being arranged relative to each other so as to support the belt with side portions of the belt sloping upwardly and outwardly with respect to a medial portion of the belt;*

*wherein the spindle is affixed to the side support and the side roller is affixed to the hub;*

*wherein the spindle has an inner threaded end that is received within the hub and receives a retainer nut for the inboard antifriction bearing;*

*wherein the inboard and outboard antifriction bearings are closely spaced apart and proximate to the side support member;*

*wherein the side roller has a circular cylindrical shell and a dust cap is affixed in the inboard end of the shell;*

*wherein the support member is a side wall of a trunking of an enclosed belt conveyor, and the spindle is affixed to a mounting bracket received in an opening in the trunking side wall; and* wherein the mounting bracket includes a sleeve surrounding an outboard end portion of the shell and the side roller unit includes a dust seal interposed between the sleeve and the shell.

*19. A troughing idler installation comprising:*

*a trunking comprising side supports located opposite each other with respect to a space along which a conveyor belt moves along a belt path;*

*a horizontal shaft extending across the space between the side supports transversely to the belt path and having a medial roller affixed thereon;*

*antifriction bearings mounted on the side supports and supporting the horizontal shaft for rotation about a shaft axis; and*

*a side roller unit supported exclusively by a side support member, each side roller unit having*

*a side roller carrier that includes a spindle, a hub, and inboard and outboard antifriction bearings interposed between the spindle and the hub, and*

*a side roller supported in cantilevered relation with respect to the side support member by the side roller carrier about a spindle axis;*

*the medial roller and the side rollers being arranged relative to each other so as to support the belt with side portions of the belt sloping upwardly and outwardly with respect to a medial portion of the belt; and*

*wherein there are no stationary parts on the portion of the side roller unit that is inside the trunking.*

*20. A troughing idler installation comprising:*

*a trunking comprising side supports located opposite each other with respect to a space along which a conveyor belt moves along a belt path;*

*a horizontal shaft extending across the space between the side supports transversely to the belt path and having a medial roller affixed thereon;* antifriction bearings mounted on the side supports and
supporting the horizontal shaft for rotation about a shaft
axis; and
a side roller unit supported exclusively by a side support
member, each side roller unit having
  a side roller carrier that includes a spindle, a hub, and
    inboard and outboard antifriction bearings interposed between the spindle and the hub, and
  a side roller supported in cantilevered relation with
    respect to the side support member by the side roller
    carrier about a spindle axis;
the medial roller and the side rollers being arranged relative to each other so as to support the belt with side
portions of the belt sloping upwardly and outwardly with
respect to a medial portion of the belt; and
wherein there are no stationary parts on the portion of the
side roller unit that is exposed to a dusty environment in
an interior of the trunking.

21. A troughing idler installation comprising:
a trunking comprising side supports located opposite each
  other with respect to a space along which a conveyor belt
  moves along a belt path;
a horizontal shaft extending across the space between the
  side supports transversely to the belt path and having a
  medial roller affixed thereon;
antifriction bearings mounted on the side supports and
  supporting the horizontal shaft for rotation about a shaft
  axis; and
a side roller unit supported exclusively by a side support
  member, each side roller unit having
  a side roller carrier that includes a spindle, a hub, and
    inboard and outboard antifriction bearings interposed between the spindle and the hub, and
  a side roller supported in cantilevered relation with
    respect to the side support member by the side roller
    carrier about a spindle axis;
the medial roller and the side rollers being arranged relative to each other so as to support the belt with side
  portions of the belt sloping upwardly and outwardly with
  respect to a medial portion of the belt; and
wherein the inboard and outboard antifriction bearings
  are disposed outside the trunking.

22. A troughing idler installation comprising
a trunking comprising side supports located opposite each
  other with respect to a space along which a conveyor belt
  moves along a belt path;
a horizontal shaft extending across the space between the
  side supports transversely to the belt path and having a
  medial roller affixed thereon;
antifriction bearings mounted on the side supports and
  supporting the horizontal shaft for rotation about a shaft
  axis; and
a side roller unit supported exclusively by a side support
  member, each side roller unit having
  a side roller carrier that includes a spindle, a hub, and
    inboard and outboard antifriction bearings interposed between the spindle and the hub, and
  a side roller supported in cantilevered relation with
    respect to the side support member by the side roller
    carrier about a spindle axis;
the medial roller and the side rollers being arranged relative to each other so as to support the belt with side
  portions of the belt sloping upwardly and outwardly with
  respect to a medial portion of the belt; and
wherein the hub and the inboard and outboard antifriction
  bearings are disposed outside the trunking.

23. A troughing idler installation comprising:
a trunking comprising side supports located opposite each
  other with respect to a space along which a conveyor belt
  moves along a belt path;
a horizontal shaft extending across the space between the
  side supports transversely to the belt path and having a
  medial roller affixed thereon;
antifriction bearings mounted on the side supports and
  supporting the horizontal shaft for rotation about a shaft
  axis; and
a side roller unit supported exclusively by a side support
  member, each side roller unit having
  a side roller carrier that includes a spindle, a hub, and
    inboard and outboard antifriction bearings interposed between the spindle and the hub, and
  a side roller supported in cantilevered relation with
    respect to the side support member by the side roller
    carrier about a spindle axis;
the medial roller and the side rollers being arranged relative to each other so as to support the belt with side
  portions of the belt sloping upwardly and outwardly with
  respect to a medial portion of the belt; and
wherein the hub is spaced apart from the side roller such
  that the inboard and outboard antifriction bearings are
  positioned outside the trunking and the side roller is
  positioned adjacent the inboard side of the trunking.

24. A troughing idler installation comprising:
a trunking substantially enclosing a conveyor belt of a belt
  conveyor, the trunking including side supports located
  opposite each other with respect to a space along which
  the conveyor belt moves along a belt path, each side
  support forming a side wall of the trunking and having
  an inboard side inside the trunking and an outboard side
  outside the trunking;
a horizontal shaft extending across the space between the
  side supports transversely to the belt path and having a
  medial roller affixed thereon;
antifriction bearings mounted on the side supports and
  supporting the horizontal shaft for rotation about a shaft
  axis;
a side roller unit supported exclusively by a side support
  member, each side roller unit having:
  a side roller carrier that includes a spindle, a hub, and
    inboard and outboard antifriction bearings interposed between the spindle and the hub, and
  a side roller supported in cantilevered relation with
    respect to the side support member by the side roller
    carrier about a spindle axis;
the medial roller and the side rollers being arranged relative to each other so as to support the belt with side
  portions of the belt sloping upwardly and outwardly with
  respect to a medial portion of the belt; and
wherein there are no stationary parts on the portion of the
  side roller unit that is inside the trunking.

25. A troughing idler installation comprising:
a trunking substantially enclosing a conveyor belt of a belt
  conveyor, the trunking including side supports located
  opposite each other with respect to a space along which
  the conveyor belt moves along a belt path, each side
  support forming a side wall of the trunking and having
  an inboard side inside the trunking and an outboard side
  outside the trunking;
a horizontal shaft extending across the space between the
  side supports transversely to the belt path and having a
  medial roller affixed thereon;

antifriction bearings mounted on the side supports and
supporting the horizontal shaft for rotation about a shaft
axis;
a side roller unit supported exclusively by a side support
member, each side roller unit having:
  a side roller carrier that includes a spindle, a hub, and
  inboard and outboard antifriction bearings interposed between the spindle and the hub, and
  a side roller supported in cantilevered relation with
  respect to the side support member by the side roller
  carrier about a spindle axis;
the medial roller and the side rollers being arranged relative to each other so as to support the belt with side
portions of the belt sloping upwardly and outwardly with
respect to a medial portion of the belt; and
wherein there are no stationary parts on the portion of the
side roller unit that is exposed to a dusty environment in
an interior of the trunking.

26. A troughing idler installation comprising:
a trunking substantially enclosing a conveyor belt of a belt
conveyor, the trunking including side supports located
opposite each other with respect to a space along which
the conveyor belt moves along a belt path, each side
support forming a side wall of the trunking and having
an inboard side inside the trunking and an outboard side
outside the trunking;
a horizontal shaft extending across the space between the
side supports transversely to the belt path and having a
medial roller affixed thereon;
antifriction bearings mounted on the side supports and
supporting the horizontal shaft for rotation about a shaft
axis;
  a side roller unit supported exclusively by a side support
  member, each side roller unit having:
  a side roller carrier that includes a spindle, a hub, and
  inboard and outboard antifriction bearings interposed between the spindle and the hub, and
  a side roller supported in cantilevered relation with
  respect to the side support member by the side roller
  carrier about a spindle axis;
the medial roller and the side rollers being arranged relative to each other so as to support the belt with side
portions of the belt sloping upwardly and outwardly with
respect to a medial portion of the belt; and
wherein the inboard and outboard antifriction bearings
are disposed outside the trunking.

27. A troughing idler installation comprising:
a trunking substantially enclosing a conveyor belt of a belt
conveyor, the trunking including side supports located
opposite each other with respect to a space along which
the conveyor belt moves along a belt path, each side
support forming a side wall of the trunking and having
an inboard side inside the trunking and an outboard side
outside the trunking;
a horizontal shaft extending across the space between the
side supports transversely to the belt path and having a
medial roller affixed thereon;
antifriction bearings mounted on the side supports and
supporting the horizontal shaft for rotation about a shaft
axis;
a side roller unit supported exclusively by a side support
member, each side roller unit having:
  a side roller carrier that includes a spindle, a hub, and
  inboard and outboard antifriction bearings interposed between the spindle and the hub, and
  a side roller supported in cantilevered relation with
  respect to the side support member by the side roller
  carrier about a spindle axis;
the medial roller and the side rollers being arranged relative to each other so as to support the belt with side
portions of the belt sloping upwardly and outwardly with
respect to a medial portion of the belt; and
wherein the hub and the inboard and outboard antifriction
bearings are disposed outside the trunking.

28. A troughing idler installation comprising:
a trunking substantially enclosing a conveyor belt of a belt
conveyor, the trunking including side supports located
opposite each other with respect to a space along which
the conveyor belt moves along a belt path, each side
support forming a side wall of the trunking and having
an inboard side inside the trunking and an outboard side
outside the trunking;
a horizontal shaft extending across the space between the
side supports transversely to the belt path and having a
medial roller affixed thereon;
antifriction bearings mounted on the side supports and
supporting the horizontal shaft for rotation about a shaft
axis;
a side roller unit supported exclusively by a side support
member, each side roller unit having:
  a side roller carrier that includes a spindle, a hub, and
  inboard and outboard antifriction bearings interposed between the spindle and the hub, and
  a side roller supported in cantilevered relation with
  respect to the side support member by the side roller
  carrier about a spindle axis;
the medial roller and the side rollers being arranged relative to each other so as to support the belt with side
portions of the belt sloping upwardly and outwardly with
respect to a medial portion of the belt; and
wherein the hub is spaced apart from the side roller such
that the inboard and outboard antifriction bearings are
positioned outside the trunking and the side roller is
positioned adjacent the inboard side of the trunking.

29. A troughing idler installation comprising:
a trunking comprising side supports located opposite each
other with respect to a space along which a conveyor belt
moves along a belt path;
a horizontal shaft extending across the space between the
side supports transversely to the belt path and having a
medial roller affixed thereon;
antifriction bearings mounted on the side supports and
supporting the horizontal shaft for rotation about a shaft
axis;
a side roller unit extending downwardly and inwardly and
supported exclusively by a side support member, each
side roller unit having:
  a side roller carrier that includes a spindle, a hub, and
  inboard and outboard antifriction bearings interposed between the spindle and the hub, and
  a side roller supported in cantilevered relation with
  respect to the side support member by the side roller
  carrier about a spindle axis;
the medial roller and the side rollers being arranged relative to each other so that the lower end of the side roller
overlaps the end portion of the medial roller so as to fully
support the belt with side portions of the belt sloping
upwardly and outwardly with respect to a medial portion
of the belt; and
wherein there are no stationary parts on the portion of the
side roller unit that is inside the trunking.

30. A troughing idler installation comprising:
a trunking comprising side supports located opposite each other with respect to a space along which a conveyor belt moves along a belt path;
a horizontal shaft extending across the space between the side supports transversely to the belt path and having a medial roller affixed thereon;
antifriction bearings mounted on the side supports and supporting the horizontal shaft for rotation about a shaft axis;
a side roller unit extending downwardly and inwardly and supported exclusively by a side support member, each side roller unit having:
a side roller carrier that includes a spindle, a hub, and inboard and outboard antifriction bearings interposed between the spindle and the hub, and
a side roller supported in cantilevered relation with respect to the side support member by the side roller carrier about a spindle axis;
the medial roller and the side rollers being arranged relative to each other so that the lower end of the side roller overlaps the end portion of the medial roller so as to fully support the belt with side portions of the belt sloping upwardly and outwardly with respect to a medial portion of the belt; and
wherein there are no stationary parts on the portion of the side roller unit that is exposed to a dusty environment in an interior of the trunking.

31. A troughing idler installation comprising:
a trunking comprising side supports located opposite each other with respect to a space along which a conveyor belt moves along a belt path;
a horizontal shaft extending across the space between the side supports transversely to the belt path and having a medial roller affixed thereon;
antifriction bearings mounted on the side supports and supporting the horizontal shaft for rotation about a shaft axis;
a side roller unit extending downwardly and inwardly and supported exclusively by a side support member, each side roller unit having:
a side roller carrier that includes a spindle, a hub, and inboard and outboard antifriction bearings interposed between the spindle and the hub, and
a side roller supported in cantilevered relation with respect to the side support member by the side roller carrier about a spindle axis;
the medial roller and the side rollers being arranged relative to each other so that the lower end of the side roller overlaps the end portion of the medial roller so as to fully support the belt with side portions of the belt sloping upwardly and outwardly with respect to a medial portion of the belt; and
wherein the hub is spaced apart from the side roller such that the inboard and outboard antifriction bearings are positioned outside the trunking and the side roller is positioned adjacent the inboard side of the trunking.

32. A troughing idler installation comprising:
a trunking comprising side supports located opposite each other with respect to a space along which a conveyor belt moves along a belt path;
a horizontal shaft extending across the space between the side supports transversely to the belt path and having a medial roller affixed thereon;
antifriction bearings mounted on the side supports and supporting the horizontal shaft for rotation about a shaft axis;
a side roller unit extending downwardly and inwardly and supported exclusively by a side support member, each side roller unit having:
a side roller carrier that includes a spindle, a hub, and inboard and outboard antifriction bearings interposed between the spindle and the hub, and
a side roller supported in cantilevered relation with respect to the side support member by the side roller carrier about a spindle axis;
the medial roller and the side rollers being arranged relative to each other so that the lower end of the side roller overlaps the end portion of the medial roller so as to fully support the belt with side portions of the belt sloping upwardly and outwardly with respect to a medial portion of the belt; and
wherein the inboard and outboard antifriction bearings are disposed outside the trunking.

33. A troughing idler installation comprising:
a trunking comprising side supports located opposite each other with respect to a space along which a conveyor belt moves along a belt path;
a horizontal shaft extending across the space between the side supports transversely to the belt path and having a medial roller affixed thereon;
antifriction bearings mounted on the side supports and supporting the horizontal shaft for rotation about a shaft axis;
a side roller unit extending downwardly and inwardly and supported exclusively by a side support member, each side roller unit having:
a side roller carrier that includes a spindle, a hub, and inboard and outboard antifriction bearings interposed between the spindle and the hub, and
a side roller supported in cantilevered relation with respect to the side support member by the side roller carrier about a spindle axis;
the medial roller and the side rollers being arranged relative to each other so that the lower end of the side roller overlaps the end portion of the medial roller so as to fully support the belt with side portions of the belt sloping upwardly and outwardly with respect to a medial portion of the belt; and
wherein the hub and the inboard and outboard antifriction bearings are disposed outside the trunking.

34. A troughing idler installation comprising:
a trunking substantially enclosing a conveyor belt of a belt conveyor, the trunking including an upper section, a lower section and side walls extending between the upper and lower sections and located opposite each other with respect to a space along which the conveyor belt moves along a belt path, each side wall having an inboard side and an outboard side;
a horizontal shaft extending across the space between the side walls transversely to the belt path and having a medial roller affixed thereon;
antifriction bearings mounted on the side walls and supporting the horizontal shaft for rotation about a shaft axis;
a side wall member removably coupled to the side wall; and
a side roller unit supported exclusively by a side wall member, each side roller unit having:
a side roller carrier connected to the outboard side of the side wall member, a portion of the side roller carrier protruding from the outboard side of the side wall and including a spindle, a hub, and inboard and outboard antifriction bearings interposed between the spindle and the hub; and a side roller supported in cantilevered relation with respect to the side wall member by the side roller carrier about a spindle axis, the hub being longitudinally-spaced apart from the side roller such that the inboard and outboard antifriction bearings are positioned outside the trunking and the side roller is positioned adjacent the inboard side of the trunking;

the medial roller and the side rollers being arranged relative to each other so as to support the belt with side portions of the belt sloping upwardly and outwardly with respect to a medial portion of the belt; and wherein there are no stationary parts on the portion of the side roller unit that is inside the trunking.

35. A troughing idler installation comprising:

a trunking substantially enclosing a conveyor belt of a belt conveyor, the trunking including an upper section, a lower section and side walls extending between the upper and lower sections and located opposite each other with respect to a space along which the conveyor belt moves along a belt path, each side wall having an inboard side and an outboard side;

a horizontal shaft extending across the space between the side walls transversely to the belt path and having a medial roller affixed thereon;

antifriction bearings mounted on the side walls and supporting the horizontal shaft for rotation about a shaft axis;

a side wall member removably coupled to the side wall; and a side roller unit supported exclusively by a side wall member, each side roller unit having:

a side roller carrier connected to the outboard side of the side wall member, a portion of the side roller carrier protruding from the outboard side of the side wall and including a spindle, a hub, and inboard and outboard antifriction bearings interposed between the spindle and the hub; and a side roller supported in cantilevered relation with respect to the side wall member by the side roller carrier about a spindle axis, the hub being longitudinally-spaced apart from the side roller such that the inboard and outboard antifriction bearings are positioned outside the trunking and the side roller is positioned adjacent the inboard side of the trunking;

the medial roller and the side rollers being arranged relative to each other so as to support the belt with side portions of the belt sloping upwardly and outwardly with respect to a medial portion of the belt; and wherein there are no stationary parts on the portion of the side roller unit that is exposed to a dusty environment in an interior of the trunking.

36. A troughing idler installation comprising side supports located opposite each other with respect to a space along which a conveyor belt moves along a belt path;

a horizontal shaft extending across the space between the side supports transversely to the belt path and having a medial roller affixed thereon;

antifriction bearings mounted on the side supports and supporting the horizontal shaft for rotation about a shaft axis;

a side roller unit supported exclusively by a side support member, each side roller unit having a side roller carrier that includes a spindle, a hub, and inboard and outboard antifriction bearings interposed between the spindle and the hub, and a side roller supported in cantilevered relation with respect to the side support member by the side roller carrier about a spindle axis;

the medial roller and the side rollers being arranged relative to each other so as to support the belt with side portions of the belt sloping upwardly and outwardly with respect to a medial portion of the belt;

protecting means for protecting a material being conveyed on the conveyor belt from an environment and the environment from the material being conveyed; and wherein there are no stationary parts on the portion of the side roller unit that is inside the protecting means.

37. A troughing idler installation comprising:

side supports located opposite each other with respect to a space along which a conveyor belt moves along a belt path;

a horizontal shaft extending across the space between the side supports transversely to the belt path and having a medial roller affixed thereon;

antifriction bearings mounted on the side supports and supporting the horizontal shaft for rotation about a shaft axis;

a side roller unit supported exclusively by a side support member, each side roller unit having a side roller carrier that includes a spindle, a hub, and inboard and outboard antifriction bearings interposed between the spindle and the hub, and a side roller supported in cantilevered relation with respect to the side support member by the side roller carrier about a spindle axis;

the medial roller and the side rollers being arranged relative to each other so as to support the belt with side portions of the belt sloping upwardly and outwardly with respect to a medial portion of the belt;

protecting means for protecting a material being conveyed on the conveyor belt from an environment and the environment from the material being conveyed; and wherein there are no stationary parts on the portion of the side roller unit that is exposed to a dusty environment in an interior of the protecting means.

38. A troughing idler installation comprising:

side supports located opposite each other with respect to a space along which a conveyor belt moves along a belt path;

a horizontal shaft extending across the space between the side supports transversely to the belt path and having a medial roller affixed thereon;

antifriction bearings mounted on the side supports and supporting the horizontal shaft for rotation about a shaft axis;

a side roller unit supported exclusively by a side support member, each side roller unit having a side roller carrier that includes a spindle, a hub, and inboard and outboard antifriction bearings interposed between the spindle and the hub, and a side roller supported in cantilevered relation with respect to the side support member by the side roller carrier about a spindle axis;

the medial roller and the side rollers being arranged relative to each other so as to support the belt with side portions of the belt sloping upwardly and outwardly with respect to a medial portion of the belt;

protecting means for protecting a material being conveyed on the conveyor belt from an environment and the environment from the material being conveyed; and wherein the hub is spaced apart from the side roller such that the inboard and outboard antifriction bearings are positioned outside the protecting means and the side roller is positioned adjacent the inboard side of the protecting means.

39. A troughing idler installation comprising:

side supports located opposite each other with respect to a space along which a conveyor belt moves along a belt path;

a horizontal shaft extending across the space between the side supports transversely to the belt path and having a medial roller affixed thereon;

antifriction bearings mounted on the side supports and supporting the horizontal shaft for rotation about a shaft axis;

a side roller unit supported exclusively by a side support member, each side roller unit having a side roller carrier that includes a spindle, a hub, and inboard and outboard antifriction bearings interposed between the spindle and the hub, and a side roller supported in cantilevered relation with respect to the side support member by the side roller carrier about a spindle axis;

the medial roller and the side rollers being arranged relative to each other so as to support the belt with side portions of the belt sloping upwardly and outwardly with respect to a medial portion of the belt;

protecting means for protecting a material being conveyed on the conveyor belt from an environment and the environment from the material being conveyed; and wherein the inboard and outboard antifriction bearings are disposed outside the protecting means.

40. A troughing idler installation comprising:

side supports located opposite each other with respect to a space along which a conveyor belt moves along a belt path;

a horizontal shaft extending across the space between the side supports transversely to the belt path and having a medial roller affixed thereon;

antifriction bearings mounted on the side supports and supporting the horizontal shaft for rotation about a shaft axis;

a side roller unit supported exclusively by a side support member, each side roller unit having a side roller carrier that includes a spindle, a hub, and inboard and outboard antifriction bearings interposed between the spindle and the hub, and a side roller supported in cantilevered relation with respect to the side support member by the side roller carrier about a spindle axis;

the medial roller and the side rollers being arranged relative to each other so as to support the belt with side portions of the belt sloping upwardly and outwardly with respect to a medial portion of the belt;

protecting means for protecting a material being conveyed on the conveyor belt from an environment and the environment from the material being conveyed; and wherein the inboard and outboard antifriction bearings are not exposed to the dusty environment of the conveyor belt.

* * * * *